United States Patent
Camus et al.

(10) Patent No.: US 8,027,811 B2
(45) Date of Patent: Sep. 27, 2011

(54) PROCESSING OF SPECTROMETER PILE-UP EVENTS

(75) Inventors: Patrick Paul Camus, Middleton, WI (US); Gregory S. Fritz, Verona, WI (US); Thomas B. Jacobs, Madison, WI (US); Dean A. Stocker, Fitchburg, WI (US); Dale Anders Wade, Mount Horeb, WI (US)

(73) Assignee: Thermo Electron Scientific Instruments LLC, Madison, WI (US)

( * ) Notice: Subject to any disclaimer, the term of this patent is extended or adjusted under 35 U.S.C. 154(b) by 626 days.

(21) Appl. No.: 12/142,737

(22) Filed: Jun. 19, 2008

(65) Prior Publication Data

US 2008/0319714 A1    Dec. 25, 2008

Related U.S. Application Data

(60) Provisional application No. 60/945,236, filed on Jun. 20, 2007.

(51) Int. Cl.
*G06F 15/00* (2006.01)

(52) U.S. Cl. .............. 702/189; 250/370.06; 250/370.09; 378/50

(58) Field of Classification Search .................. 702/189; 250/370.06, 370.01, 370.09, 370.08, 370.13; 378/44, 50, 98.8, 99; 356/454, 519
See application file for complete search history.

(56) References Cited

U.S. PATENT DOCUMENTS

| | | | |
|---|---|---|---|
| 5,225,682 A | | 7/1993 | Britton, Jr. et al. |
| 5,774,522 A | * | 6/1998 | Warburton ............ 378/91 |
| 5,873,054 A | * | 2/1999 | Warburton et al. ............ 702/190 |
| 6,310,349 B1 | * | 10/2001 | Wong et al. ............ 250/363.09 |
| 6,369,393 B1 | * | 4/2002 | Jordanov ............ 250/395 |
| 6,525,322 B2 | * | 2/2003 | Wong et al. ............ 250/363.09 |
| 6,609,075 B1 | * | 8/2003 | Warburton et al. ............ 702/87 |
| 6,936,822 B2 | * | 8/2005 | Wong et al. ............ 250/363.09 |
| 2002/0121603 A1 | * | 9/2002 | Wong et al. ............ 250/363.09 |
| 2004/0036025 A1 | * | 2/2004 | Wong et al. ............ 250/363.09 |
| 2006/0015290 A1 | | 1/2006 | Warburton et al. |
| 2006/0276706 A1 | | 12/2006 | Klein et al. |

OTHER PUBLICATIONS

Gerd I. Johansson, "Modifications of the HEX Program for Fast Automatic Resolution of PIXE-Spectra," X-Ray Spectrometry, vol. 11 (No. 4), pp. 194-200, (1982).

Kotula et al., "Automated Analysis of SEM X-Ray Spectral Images: A Powerful New Microanalysis Tool," Micros. Microanal., Microscopy Society of America, vol. 9, pp. 1-17, (2003).

(Continued)

*Primary Examiner* — Carol Tsai
(74) *Attorney, Agent, or Firm* — Michael C. Staggs (57) ABSTRACT

In an energy dispersive spectrometer wherein event (particle/photon) detection is performed by counting events spaced by greater than a shaping time, events which are spaced by less than the shaping time are also collected and counted. These "combined events" are treated similarly to "single events" which are spaced by greater than the shaping time, and can be used to generate combined-event spectra for comparison and/or use with the conventional single-event spectra. The combined-event spectra can be compared to the single-event spectra to provide an indication of data quality; can be subtracted from the single-event spectra to remove artifacts, and/or can be deconvolved into a single-event spectrum to increase the resolution of the single-event spectrum.

13 Claims, 9 Drawing Sheets

OTHER PUBLICATIONS

Papp et al., "Quality Assurance Challenges in X-Ray Emission Based Analyses, the Advantages of Digital Signal Processing," Analytical Sciences, The Japan Society for Analytical Chemistry, pp. 737-745, (2005).

K. A. Sjöland et al., "Time-Resolved Pile-Up Compensation in PIXE Analysis with List-Mode Collected Data," Nuclear Instruments and Methods in Physics Research B, vol. 150 (No. 1-4), pp. 69-75, (1999).

Peter J. Statham, "Pile-Up Correction for Improved Accuracy and Speed of X-Ray Analysis," Microchimica Acta, Springer Verlag, pp. 1-6, (2006).

* cited by examiner

PROCESSING OF SPECTROMETER PILE-UP EVENTS

CROSS-REFERENCE TO RELATED APPLICATIONS

This application claims priority under 35 USC §119(e) to U.S. Provisional Patent Application 60/945,236 filed 20 Jun. 2007, the entirety of which is incorporated by reference herein.

FIELD OF THE INVENTION

The invention discussed in this document generally relates to detection of particles and/or radiation in energy dispersive spectrometers, e.g., x-ray fluorescence (XRF) spectrometers, particle-induced x-ray emission (PIXE) spectrometers, and electron columns (as in scanning electron microscopes (SEMs) and transmission electron microscopes (TEMs)). The invention more specifically relates to the generation of useful information from "pile-up events", i.e., from measurements of the energy of detected particles and/or photons which are so closely spaced in time that their individual energies cannot be accurately discerned.

BACKGROUND OF THE INVENTION

Numerous analytical instruments operate by directing particles and/or radiation (photons) at a specimen, and then measuring the number and energy of particles/photons emitted by the specimen in response. For example, in an X-ray fluorescence spectrometer, X-rays and/or gamma rays are directed at a specimen, and as the atoms of the specimen ionize in response to the incident radiation, photons are emitted with energies characteristic of the specimen's component atoms. The energies of the photons are then measured by a detector along with their time of detection. By compiling a spectrum containing the numbers and energies of the emitted photons and comparing it to reference spectra (spectra generated from known substances), one may obtain information regarding the substances present in the specimen.

Figure 1A:
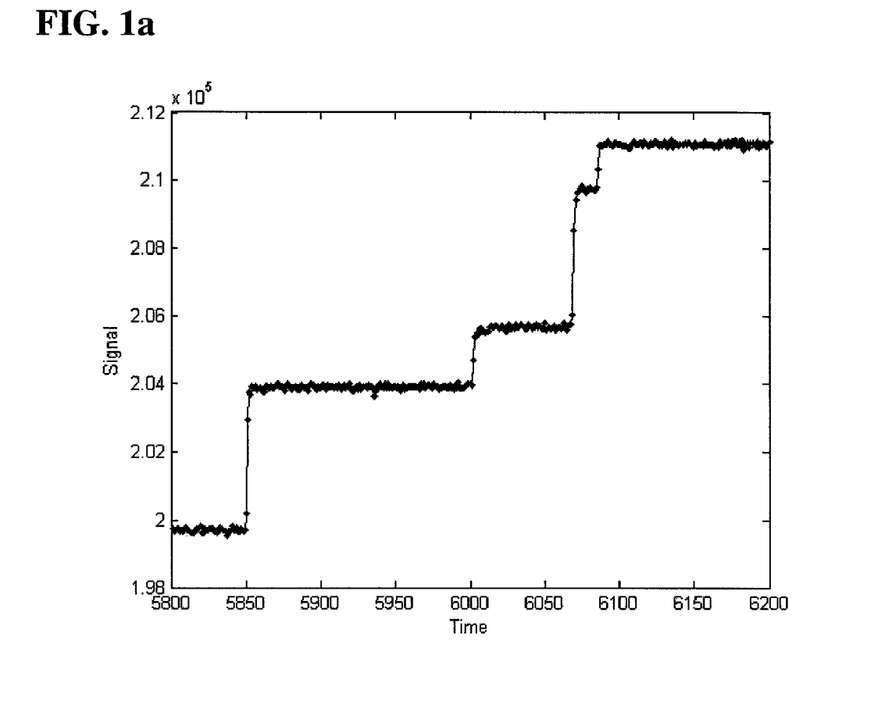
FIG. 1a is a plot of a signal from the detector of a spectrometer, illustrating events (i.e., photon/particle detection) at 5850, 6000, 6065 and 6085 microseconds.
Figure 1B:
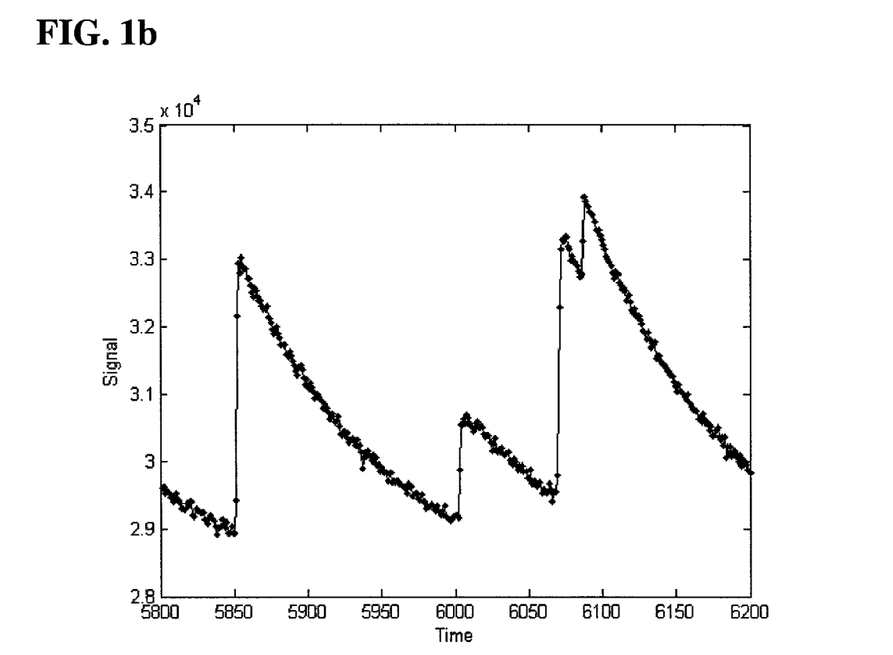
FIG. 1b is a depiction of the plot of FIG. 1a after being subjected to high-pass filtering (i.e., removal of low-frequency signal components).

However, difficulties often arise with the accurate measurement of photon energies. This is best understood with reference to FIGS. 1a-1d, which illustrate the output of a detector (e.g., a Silicon Drift Detector (SDD), Lithium-drifted Silicon (Si(Li)) detector, photodiode, silicon multi-cathode detector (SMCD), PiN diode, or other particle/photon sensor). The detector usually has a step-like output as exemplified in FIG. 1a, wherein each point along the signal trace represents a sampled measurement from the detector. Each step (rise) along the signal trace occurs at the time of particle/photon detection, with the height of the step being correlated to the energy of the particle/photon. Such detector output may be translated into different forms for analysis; for example, in FIG. 1b, the signal of FIG. 1a is differentiated by passing it through a high-pass filter, and in FIG. 1c, the signal of FIG. 1b is converted to a spike-like form by subtracting from each point the value of the prior point, and applying a decaying exponential to account for the slope arising from the filter's differentiation. The time and energy of each spike in FIG. 1c then represents the time and energy of each detected particle/photon. Regardless of the form of the detector output signal used for analysis, the objective is to obtain an accurate determination of the energy at each rise or spike—generally referred to as an "event" (with "event" referring to the receipt of a particle/photon)—so that a spectrum can be generated, i.e., a distribution of the energies of the events (the detected particles/photons). The spectrum is often displayed to the user in the form of a histogram showing intervals of event energies and the number (count) of events falling within each interval, with an exemplary spectrum being shown in FIG. 2.

A spectrum has greater value if the energies of its events are measured with higher resolution, since this eases comparison of the measured spectrum with reference spectra. One could measure event energies by simply subtracting the energy of the point before each event (rise) in FIGS. 1a and 1b from the energy of the point after each event, or by measuring the maximum energy of each event (spike peak) in FIG. 1c. However, owing to the background noise of the detector—best seen by the variations about zero energy in FIG. 1c at the times where no spikes exist—this does not result in highest resolution. It is therefore conventional to determine event energies from signals such as those in FIG. 1a by applying the concept of a "shaping time": the average of the energies of several points prior to the event—all points fitting within some defined time interval prior to the event—are subtracted from the average of the energies of several points after the event (here all points fitting within the same time interval applied after the event). For example, in FIG. 1a, looking to the first event (occurring around 5850 microseconds) and applying a 30 microsecond shaping time, the average of the energies over a 30 microsecond shaping time prior to the rise (as indicated by the first point having significantly higher value) may be subtracted from the average of the energies in the 30 microseconds thereafter to obtain a measure of the event energy. The result is a measurement of the event energy with significantly higher resolution. (Note that points are often sampled during the rise itself, and to avoid their skewing of the averaged pre-event and/or post-event energies, these are often excluded from the averaging. This is often done by determining the start of an event by use of some discrimination algorithm which locates points which have a significant value change with respect to the energy of a prior point, with the prior point then being the last pre-event point, and then locating the points thereafter which do not exhibit significant value changes, with the first of these representing the first pre-event point.)

Figure 1C:
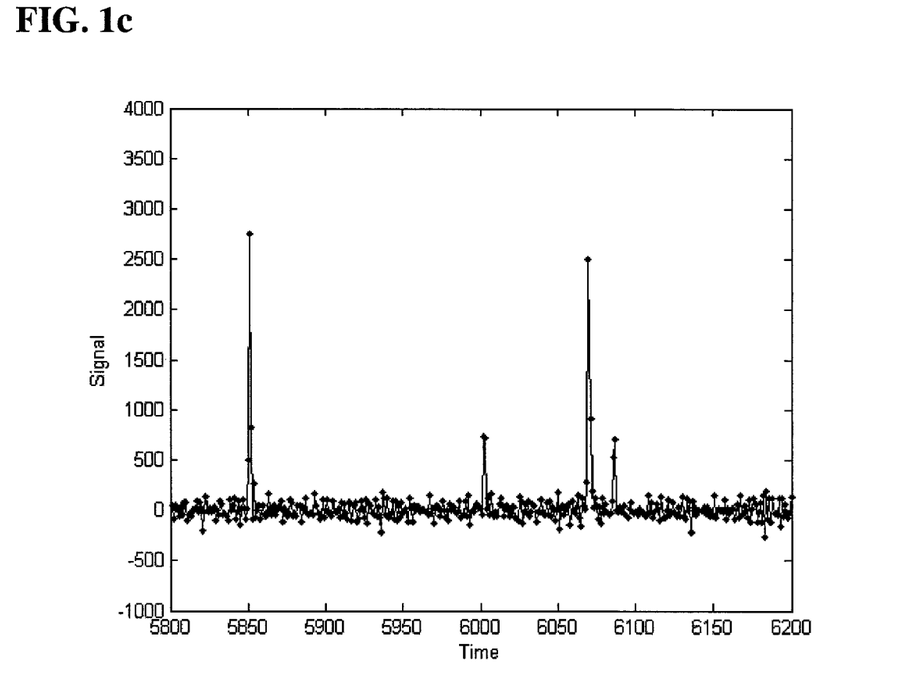
FIG. 1c is a depiction of the plot of FIG. 1b after further processing, with the events here being depicted by spikes.

The shaping time concept can also be applied to signals such as those in FIG. 1c by taking, at each point, the sum of some number of prior points falling within a defined time interval before the point in question. This results in a signal such as that shown in FIG. 1d, wherein each event in FIG. 1c is now represented by a pulse (and with summing at each point here occurring over the last 30 microseconds). In this case, the shaping time is usually referred to as a "moving window," since points are summed over a moving window of time analogous to the shaping time. Here, again looking to the first event (at about 5850 microseconds), one can then average the energies over the pulse to obtain a higher resolution measurement of the energy of the event.

However, the foregoing methods of determining event energies become problematic when events are closely spaced in time, more specifically when they are spaced by less than the shaping time. This can be understood with reference to the third and fourth events shown in FIGS. 1a-1d, i.e., the events occurring at around 6065 and 6085 microseconds. If one considers use of the aforementioned exemplary 30 microsecond shaping time to the third (6065 microsecond) event of FIG. 1a, it is clear that an accurate measure of the pre-event energy can be obtained: the pre-event energies are relatively constant over the 30 microseconds prior to the event, and thus averaging these values will provide a good representative value of the pre-event energy. However, since another event occurs within the 30 microseconds thereafter, an average of the post-event points over these 30 microseconds will be inaccurate—it will not accurately reflect the value of the post-event energy occurring after 6065 microseconds and prior to the 6085 microsecond event. The determination of the energy of the fourth event at 6085 microseconds will also be inaccurate with a 30 microsecond shaping time because the pre-event energy will not be accurately reflected by an average of the points over the 30 microseconds prior to the event. As a result, the third and fourth events would not be counted when collecting the event energies and generating the spectrum. The period spanning the shaping time prior to and after an event is often referred to as "dead time": no other events can be detected during the dead time, or else all events therein must be discarded because their energies cannot be determined with the desired resolution. In essence, dead time reflects time which cannot be used to collect events, and it is therefore desirable to reduce dead time to increase throughput (event collection rates).

Figure 1D:
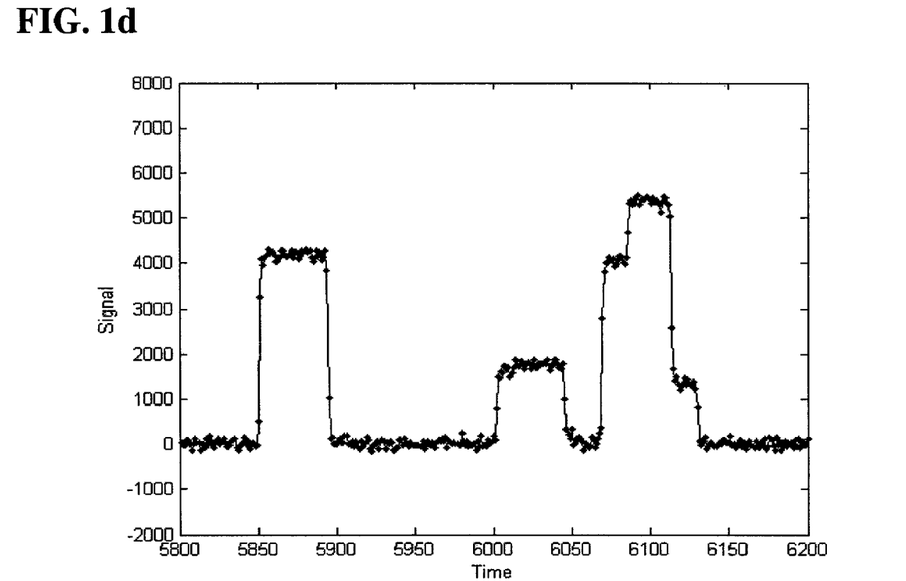
FIG. 1d is a depiction of the plot of FIG. 1c after further processing, with the events here being depicted by pulses.

The problem of discarded dead time events is not avoided when analyzing the detector signal in other forms, such as the forms of FIGS. 1b-1d. For example, when the signal of FIG. 1d is analyzed, averaging the energies at the top of the first and second pulses over a 30 microsecond moving window will provide a useful measurement of the event energies of the first and second events, but averaging the energies over the 30 microseconds following the third (6065 microsecond) and fourth (6085 microsecond) events will not yield an accurate measure of these events.

The foregoing problem—the condition where two or more events occur during the shaping time, requiring that they be excluded from the spectrum is often referred to as "pile-up," and it is significant because it occurs very often. It is not uncommon for as many as 50% of the events captured during spectral measurements to be discarded owing to pile-up. This is disadvantageous because the ability to accurately compare a spectrum to reference spectra increases with the spectrum's event count. There are ways to reduce or avoid discarded dead time events, such as by reducing the shaping time; for example, averaging pre- and post-event energies before and after the third and fourth events of FIG. 1a over a 5 microsecond shaping time would seem to avoid the problem of including an extra event within an average. However, since pre- and post-event energies are determined with better resolution with longer shaping times, a shorter shaping time results in a lower-resolution measure of event energies. It is also possible to use a variable shaping time—for example, by determining the pre-event energy for the third event over a 30 microsecond shaping time, and then applying a post-event shaping time of 5 microseconds to avoid inclusion of the forth event. This methodology also has disadvantages because it results in a spectrum wherein the event energies have varying resolutions. Another solution is to increase event counts by increasing the time over which the specimen is analyzed, but increasing analysis time increases inconvenience, since analysis results are usually desired as soon as feasibly possible.

SUMMARY OF THE INVENTION

The invention, which is defined by the claims set forth at the end of this document, is directed to methods of processing spectrometer detector data wherein the aforementioned problems are at least partially alleviated, as well as spectrometers which execute such methods. A basic understanding of some of the preferred features of the invention can be attained from a review of the following brief summary of the invention, with more details being provided elsewhere in this document.

Figure 2:
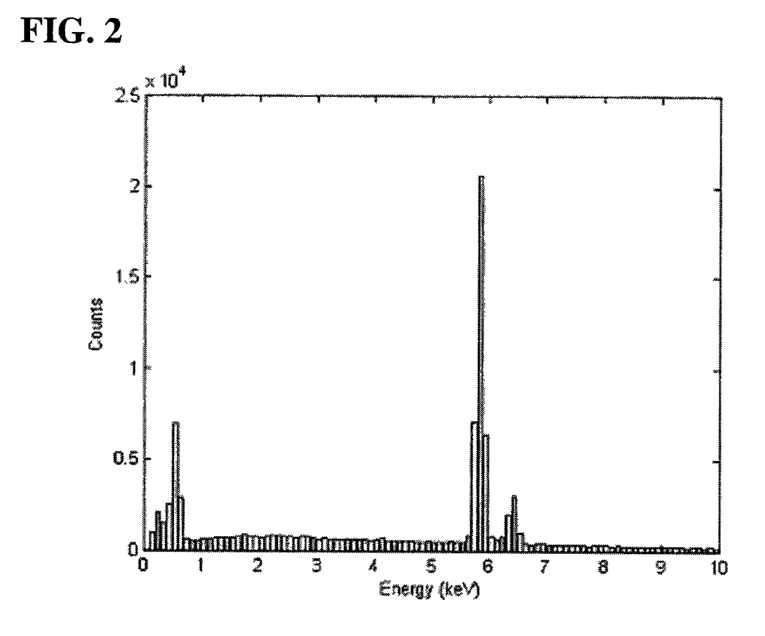
FIG. 2 is a measured spectrum of an exemplary Manganese specimen with the events therein being collected via use of conventional processing techniques, i.e., only single events are counted and pile-up events are rejected.

Closely-spaced spectrometer detector events, in particular pile-up events, may be processed in the following manner (with the following steps being depicted in the flowchart of FIG. 14). Initially, as depicted at step 100 in FIG. 14, detector data items including detector measurement values and their respective times—in other words, the aforementioned detector measurement points—may be collected in any conventional manner (e.g., they may be presented as in FIGS. 1a-1d, or in other forms). Events are then identified within the data items (step 110 in FIG. 14), as by applying a discrimination algorithm which determines when the measurement value of a data item experiences a significant value change with respect to the measurement value of the prior data item. A desired shaping time is set (step 120 in FIG. 14), as by adopting a predefined default shaping time, a user-defined shaping time, and/or a shaping time determined by such factors as spectrometer settings, detector sampling rate, etc. Events may be collected in traditional fashion, i.e., each event having no other adjacent events occurring within the shaping time either prior to the event or thereafter can have its event value calculated (by subtracting the pre-event value from the post-event value as discussed earlier). As shown at step 130 in FIG. 14, these events, which may be referred to as single events since only a single event occurs within the shaping time before the event and thereafter, may have their event values collected and used as desired (for example, to generate a conventional spectrum as shown in FIG. 2).

Figure 14:
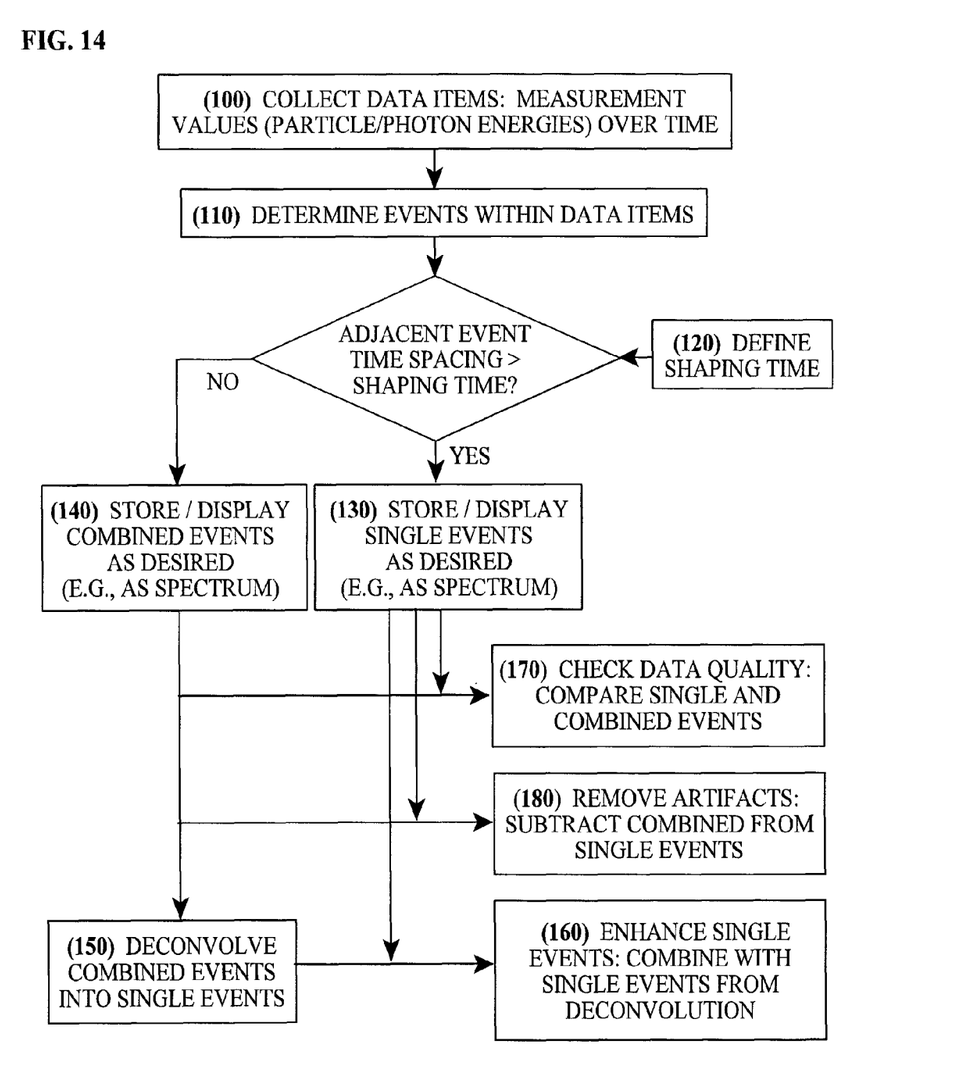
FIG. 14 is a flowchart illustrating the processes discussed above, showing the use of a combined-event spectrum 140 in combination with the single-event spectrum 130 to check data quality (at 170), to remove artifacts from the single-event spectrum (at 180), and to enhance the number of counts in, and the resolution of, the single-event spectrum (at 160).

However, for each set of two or more events wherein no two adjacent events within the set are spaced by more than the shaping time, a combined event value is defined which represents the measurement values of all of the events within the set (step 140 in FIG. 14). Stated differently, the combined event value represents the energy of an event as well as the energies of the adjacent events resting within the shaping time before and/or after the event. To illustrate, look to FIG. 1a and assume a 30 microsecond shaping time. Event 1 (~5850 microseconds) is spaced from event 2 (~6000 microseconds) by more than the shaping time, and events 2 (~6000 microseconds) and 3 (~6065 microseconds) are also spaced by more than the shaping time. However, events 3 (~6065 microseconds) and 4 (~6085 microseconds) are not spaced by more than the shaping time, and thus a combined event value would be stored for these events, as by subtracting the pre-event value of event 3 (i.e., the averaged energies of the points over the shaping time prior to event 3) from the post-event value of event 4 (i.e., the averaged energies of the points over the shaping time after event 4). By compiling all such combined event values, one can generate a combined event spectrum. More preferably, several combined event spectra are compiled, with one spectrum including all combined events formed of two events (a "double-event spectrum"), another spectrum including all combined events formed of three events (a "triple-event spectrum"), and so forth.

Figure 3:
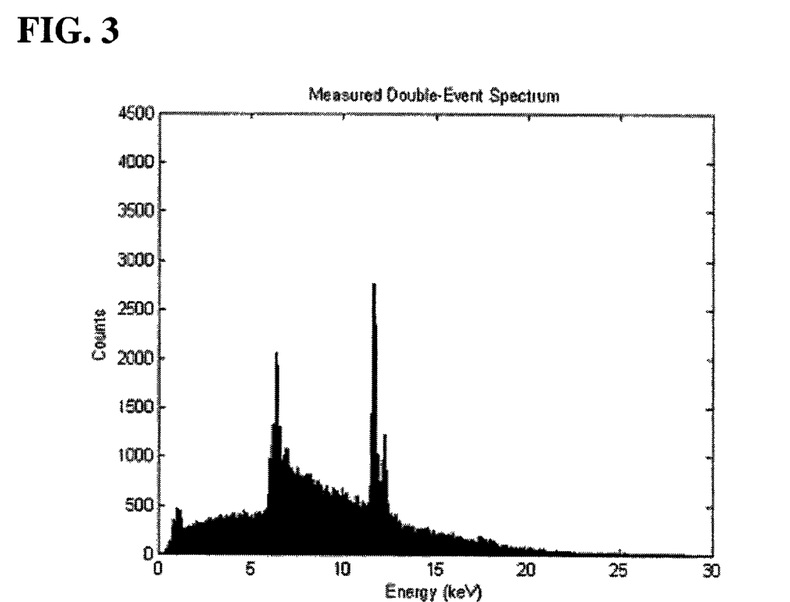
FIG. 3 is a measured combined spectrum—more specifically, a double-event spectrum—collected simultaneously with the spectrum in FIG. 2 using the techniques of the invention.

The combined event spectrum (or spectra) can then be used for several purposes. Initially, it can be stored and/or displayed in the same manner as a conventional "single-event" spectrum (e.g., in the same manner as the spectrum of FIG. 2), and can be analyzed for the information it contains. To illustrate, FIG. 3 shows a combined event spectrum as a histogram wherein the numbers of combined event values (more specifically the values of double events) within each of a series of combined event value intervals (10 eV intervals or "bins") are shown, with the combined event spectrum of FIG. 3 being collected from the same specimen used to generate the single-event spectrum of FIG. 2. The single-event spectrum of FIG. 2 was taken from a Manganese specimen, and illustrates three main peaks: a peak at approximately 0.5 keV which is characteristic of Oxygen (a "K-alpha line") and also of Manganese (an "L line") (i.e., the peaks for these elements overlap), a peak characteristic of Manganese (a "K-alpha line") approximately 6 keV, and another peak characteristic of Manganese (a "K-beta line") at approximately 6.5 keV. Comparing the double-event spectrum of FIG. 3, which was generated from pile-up events rejected during the collection of the single events of FIG. 2, it is seen that peaks preferentially occur at energies corresponding to the sum of single event energies from the peaks in FIG. 2: at approximately 1 keV in FIG. 3, a peak arises from the combination of two detected Oxygen K x-rays occurring at a time spacing too small to be independently measured using the defined shaping time. In other words, the 1 keV peak in FIG. 3 represents two "piled-up" Oxygen K x-ray events which were rejected in the collection of the spectrum of FIG. 2. In similar respects, a peak arises at approximately 6.5 keV in FIG. 3 owing to the combination of an Oxygen K x-ray and a Manganese K-alpha x-ray; a peak arises at approximately 7 keV owing to the combination of an Oxygen K x-ray and a Manganese K-beta x-ray; a peak arises at approximately 12 keV owing to the combination of two Manganese K-alpha x-rays; and a peak arises at approximately 12.5 keV owing to the combination of a Manganese K-alpha x-ray and a Manganese K-beta x-ray. The background noise in FIG. 3 can be attributed to a pair of "background events" (e.g., events arising from non-characteristic radiation, such as Bremsstrahlung radiation), or to a background event plus an event from one of the peaks. In any event, it is seen that the combined (double) event spectrum of FIG. 3 bears useful information regarding the specimen from which it was obtained, and thus may be used instead of or alongside a conventional single-event spectrum such as that of FIG. 2.

However, since a combined event spectrum such as that of FIG. 3 is not as readily interpreted as a conventional single-event spectrum, it is preferably further processed into a more useful form. In particular, as shown at step 150 of FIG. 14, the combined events can be mathematically deconvolved into single events. These calculated single events can then be compiled into a single-event spectrum (i.e., the spectrum of FIG. 3 could be converted into a spectrum analogous to that of FIG. 2), and/or these calculated single events can be compiled with any measured single events that were collected alongside the measured combined events (i.e., the spectrum of FIG. 3 could be combined with the spectrum of FIG. 2), as shown at step 160 of FIG. 14. Deconvolution can be performed in a variety of ways.

Figure 4:
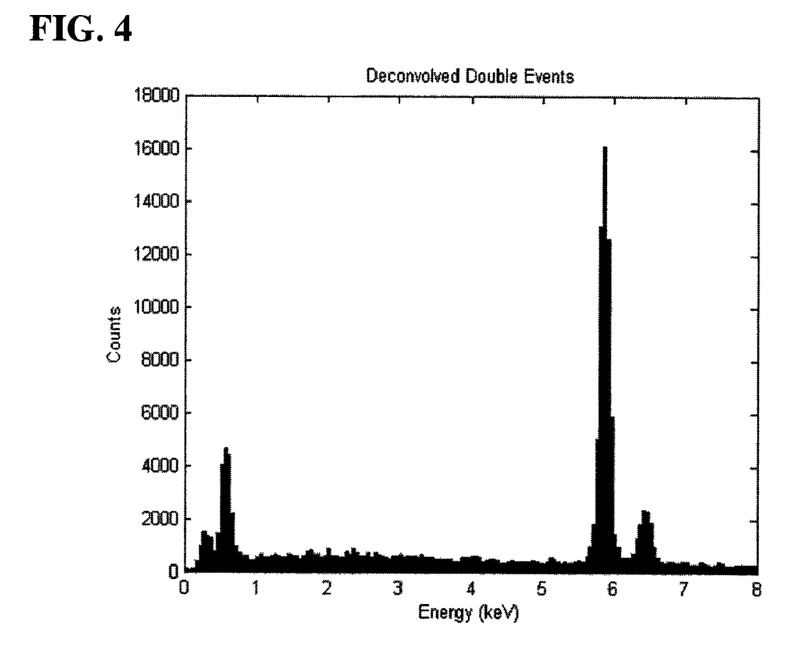
FIG. 4 is an estimated single-event spectrum produced by deconvolving the measured double-event spectrum of FIG. 3 without reference to the measured single-event spectrum of FIG. 2.

First, deconvolution can be performed without reference to any measured single-event spectrum collected alongside the combined event spectrum. For example, in a combined event (double event) spectrum such as that of FIG. 3, it is known that each peak is formed of the sum of two single events. The first peak has an energy which is probably equal to twice the energy of the lowest-energy peak in the analogous single-event spectrum; the second peak has an energy which is probably equal to the sum of the lowest-energy peak and the next lowest-energy peak in the analogous single-event spectrum; and so forth. Thus, the problem is effectively one of deriving values A, B, C, . . . , given only A+A, A+B, A+C, . . . B+C, and so forth. Using mathematical techniques, the energy value of each measured combined event is therefore broken into two or more estimated single-event energy values which each have lesser value than the corresponding measured combined event, and wherein the combination of the estimated single-event values at least approximates the measured combined event value. The estimated single event values resulting from this process can then be compiled and treated as a single event spectrum, or they can be combined with measured single event values, e.g., the estimated and measured single event values can be compiled and treated together as a single event spectrum. To illustrate, FIG. 4 shows an estimated single-event spectrum produced by the foregoing deconvolution process as applied to the measured double-event spectrum of FIG. 3. This spectrum could, if desired, be combined with the measured single-event spectrum of FIG. 2, or could simply be compared to the measured single-event spectrum of FIG. 2 (for example, to serve as a check for data quality, as discussed below). The advantage of this type of deconvolution is that the estimated single-event spectrum generated from the measured double-event spectrum is independent of (not correlated to) the measured single-event spectrum, and thus its use as a check of, or as an addition to, the measured single-event spectrum does not propagate any data quality flaws present in the measured single-event spectrum. However, the disadvantage of this type of deconvolution is that the computational scheme described above must generally be iteratively performed, and is computationally expensive and time-consuming.

Figure 5:
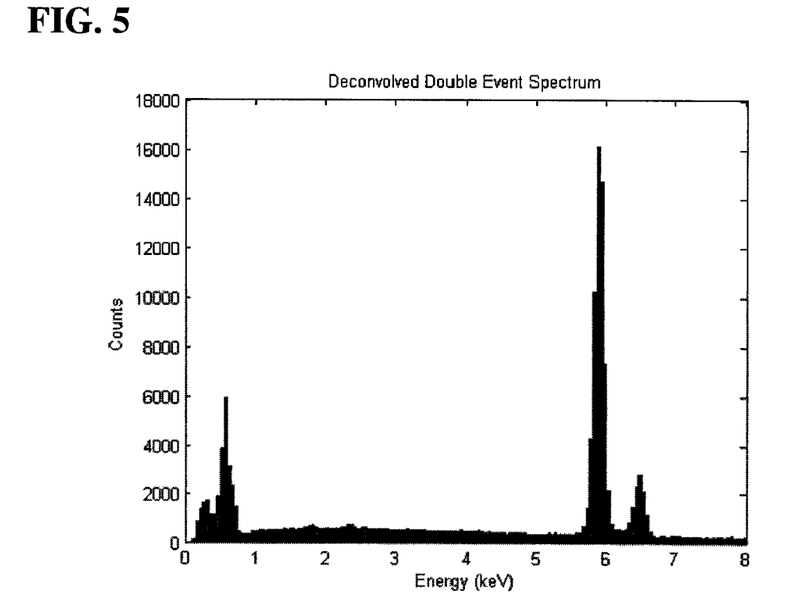
FIG. 5 is an estimated single-event spectrum produced by deconvolving the measured double-event spectrum of FIG. 3 using the measured single-event spectrum of FIG. 2.

Second, deconvolution can be performed with reference to any measured single-event spectrum collected alongside the combined event spectrum. In this case, deconvolution can be very rapidly performed, but the disadvantage is that the resulting estimated single-event spectrum is correlated with the measured single-event spectrum. Here, one may look to the measured single-event spectrum and discern which single-event peaks have energies which sum (at least approximately) to the energies of the double-event peaks in the measured double-event spectrum. Each measured double event can then be replaced by a pair of measured single events (or by an approximation thereof). Here, since the measured single-event spectrum serves as a guide for deconvolving the measured double-event spectrum, any statistical variations in the measured single-event spectrum will be propagated into the estimated single-event spectrum. FIG. 5 shows an estimated single-event spectrum generated from the measured double-event spectrum of FIG. 3, wherein the measured single-event spectrum of FIG. 2 was used to generate initial estimates of the component events within the double events.

Figure 6:
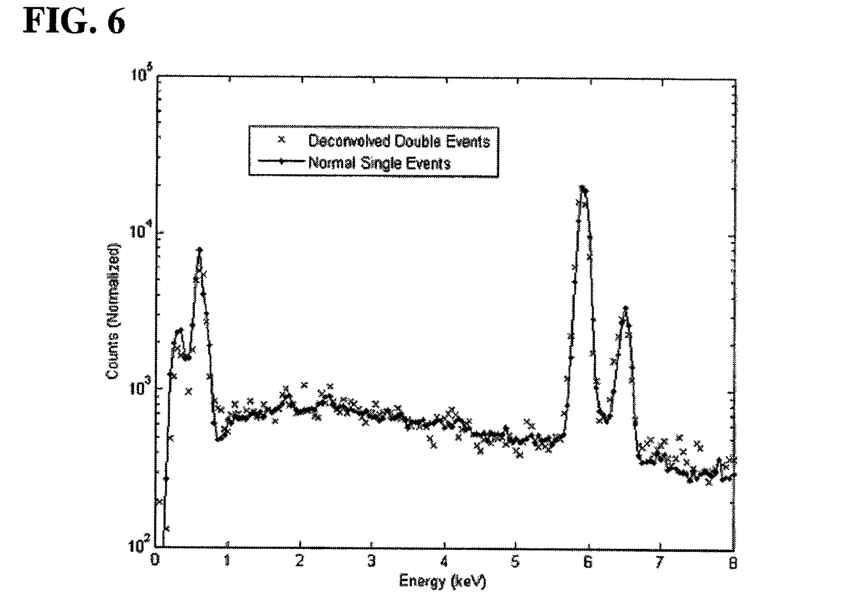
FIG. 6 is a comparison of the conventional single-event spectrum of FIG. 2 to the estimated single-event spectrum of FIG. 4 (with the spectra being normalized).

As noted previously (and as shown at step 170 of FIG. 14), the estimated single-event spectrum calculated from a measured combined-event spectrum can be compared to a measured single-event spectrum to serve as a useful check on the data quality of the measured single-event spectrum. FIG. 6 shows a plot of the estimated single-event spectrum calculated from the measured combined-event spectrum of FIG. 3, superimposed over the measured single-event spectrum of FIG. 2 (and with the event counts being normalized). The fairly high degree of correspondence between the two indicates that there were probably not any significant data collection errors when collecting the measured single-event spectrum. In contrast, if large discrepancies exist between the measured single-event spectrum and the estimated single-event spectrum, this can indicate the presence of a data collection flaw, such as poor discrimination of single events in the measured single-event spectrum (i.e., where single events are misidentified as double events by the discrimination algorithm, or where non-events are misidentified as single events). When this occurs, parameters might be adjusted in the pulse processor to better identify true events. It is notable that rather than comparing an estimated single-event spectrum to the measured single-event spectrum to check for data collection flaws, one could instead (or additionally) generate an estimated combined-event spectrum from a measured single-event spectrum, and can compare this estimated combined-event spectrum to the measured combined-event spectrum to check for data collection flaws.

Figure 7:
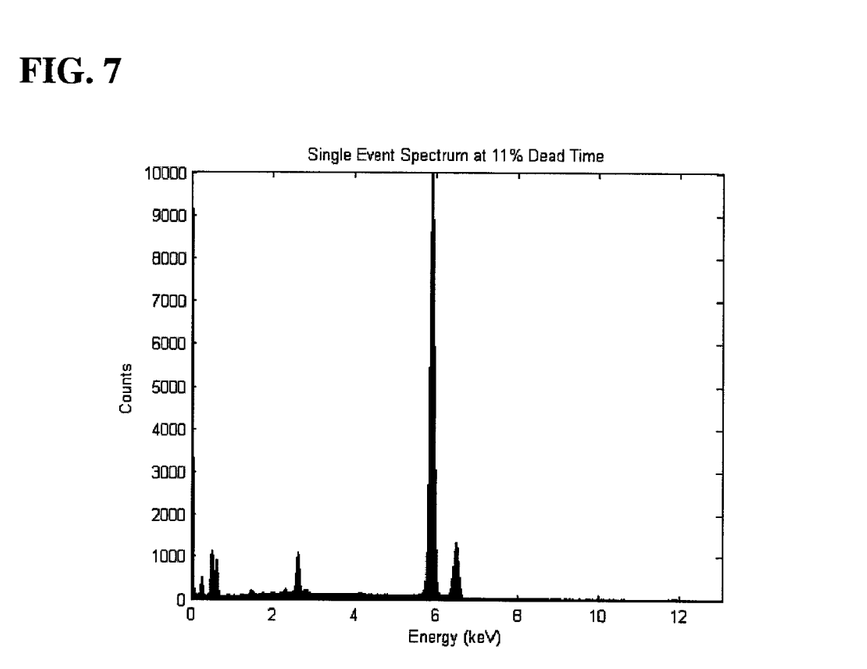
FIG. 7 is a measured single-event spectrum obtained from a specimen at a lower count rate (one corresponding to 11% dead time).
Figure 8:
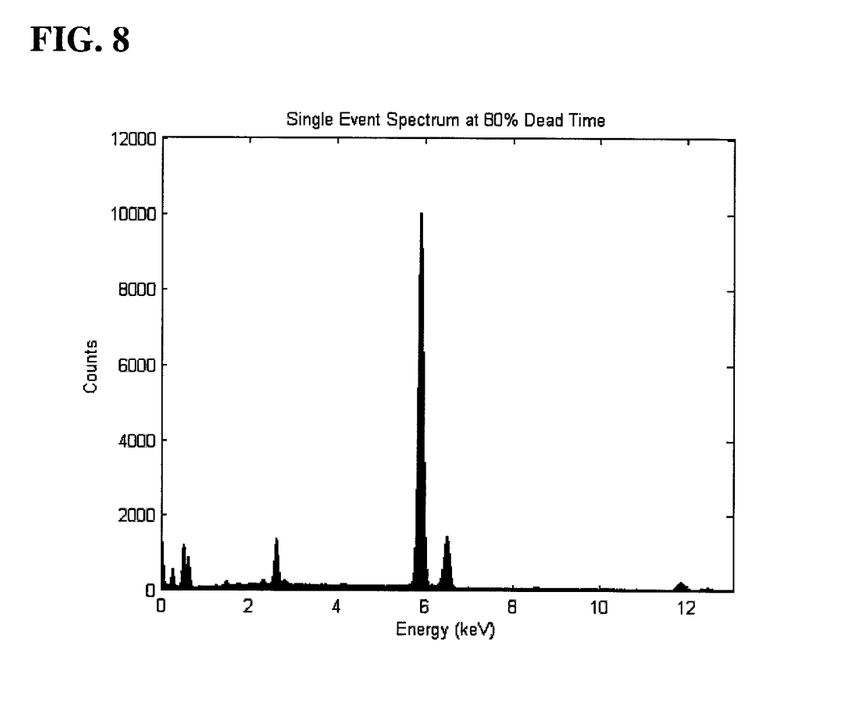
FIG. 8 is a measured single-event spectrum obtained from the specimen of FIG. 7 at a higher count rate (one corresponding to 80% dead time).
Figure 9:
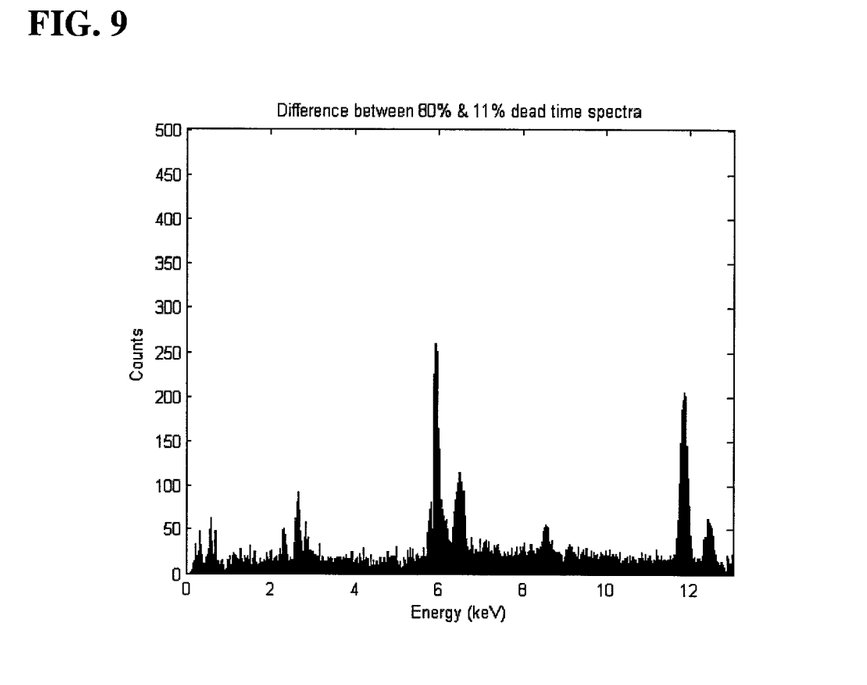
FIG. 9 illustrates the resulting spectrum when the spectrum of FIG. 7 is subtracted from that of FIG. 8.
Figure 10:
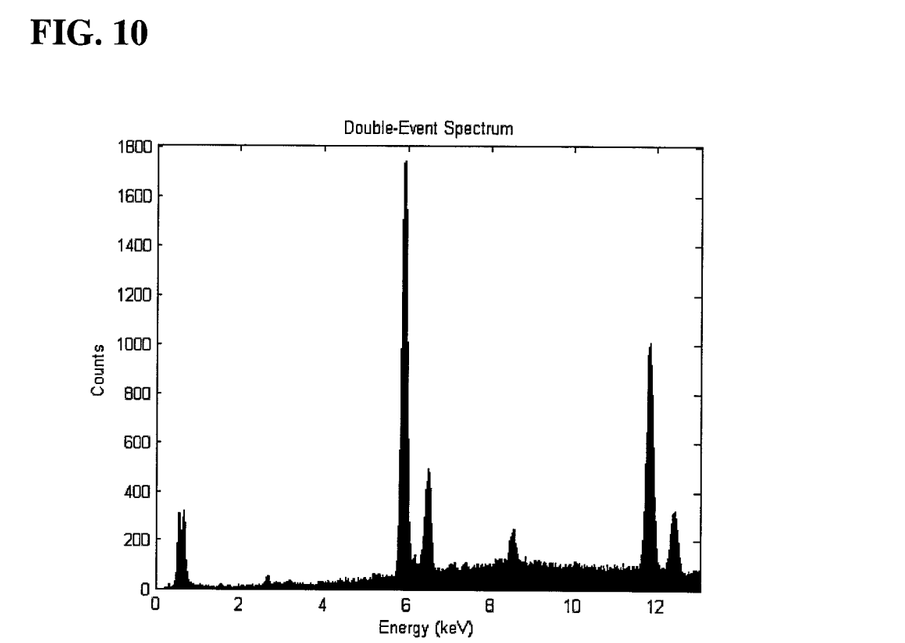
FIG. 10 is a measured double-event spectrum obtained from the specimen of FIGS. 7-8.
Figure 11:
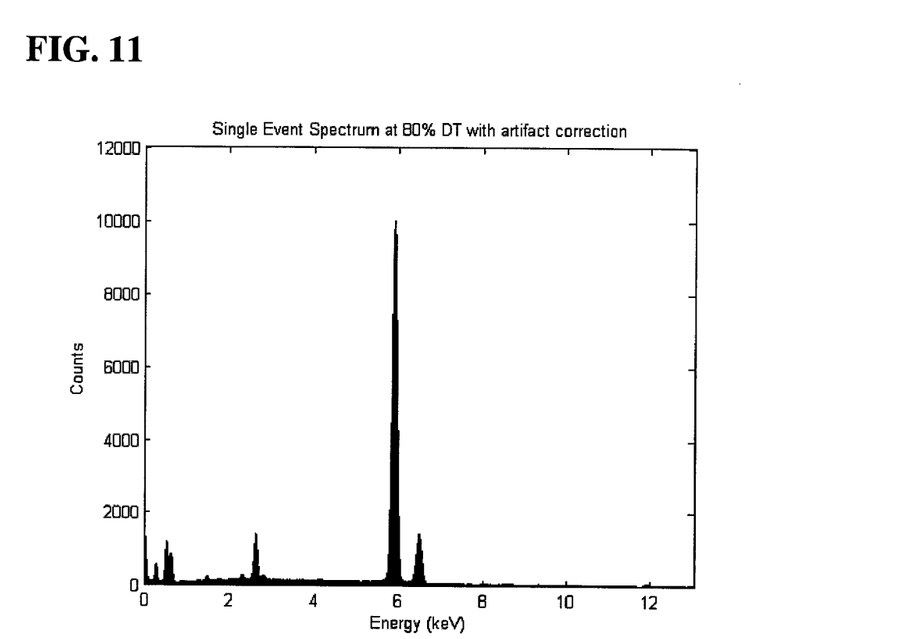
FIG. 11 presents the measured single-event spectrum of FIG. 8 after subtraction of the measured double-event spectrum of FIG. 10 (with the double-event spectrum being scaled prior to subtraction).

In similar respects, a measured combined-event spectrum can be used to remove undesirable artifacts from a measured single-event spectrum (step 180 of FIG. 14). Artifacts can arise from a variety of factors, e.g., from ambient radiation, from signal processing steps (as in FIGS. 1b-1d), from flaws in event detection schemes, and so forth. One common type of artifact arises from "undetected pile-up," a situation where detected photons/particles are so close in time that they are not counted as separate events, and thus are detected as a single event with an energy equal to the sum of the individual photon/particle energies. (This is in contrast to the "conventional" or "detected" pile-up which is the main focus of the discussion above, wherein closely-spaced events are discriminated as separate events, but are not directly counted as separate events because they are spaced by less than the shaping time.) Different types of artifacts can become more prevalent at different operating conditions, and operation at high count rates—which corresponds to higher dead time—can particularly tend to enhance artifacts. To illustrate, FIG. 7 illustrates a measured single-event spectrum obtained at a lower count rate (11% dead time), FIG. 8 illustrates a measured single-event spectrum from the same specimen obtained at a higher count rate (80% dead time), and FIG. 9 illustrates the difference between these spectra. At least some of the peaks apparent in FIG. 9 arise from artifacts; for instance, the peaks at around 12 keV appear to be "sum peaks" caused by the undetected pile-up of 6 keV events (i.e., two 6 keV events are counted as a single 12 keV event). (As discussed below, methods of removing sum peaks from spectra are known, and are commonly implemented in spectral analysis software. However, removal is usually imperfect, as here, where the sum peaks are still reflected in FIGS. 7-9.) It has been found that combined-event spectra provide a good reflection of artifacts arising from both detected and undetected pile-up, as can be seen from a comparison of the double-event spectrum of FIG. 10 with FIG. 9, and thus a single-event spectrum can be at least partially "cleaned" of artifacts by subtracting its corresponding multiple-event spectrum from the single-event spectrum, or by at least subtracting the portions of the multiple-event spectrum which do not have a clear counterpart in the single-event spectrum (e.g., the 12 keV peaks of FIG. 10, which are only barely visible in FIG. 8). Most preferably, the multiple-event spectrum is scaled prior to subtraction from the single-event spectrum, e.g., it can be given lower weight if measured at lower count rates (lower dead time) and given a higher weight at higher count rates (higher dead time) to reflect the increasing incidence of artifacts at higher count rates. It is particularly useful to scale the multiple-event spectrum on a channel-by-channel basis so that portions of the multiple-event spectrum which are more unique to the multiple-event spectrum are more heavily weighted for subtraction (such as the aforementioned 12 keV peaks of FIG. 10). To illustrate, FIG. 11 depicts the single-event spectrum of FIG. 8 after cleaning by subtraction of the scaled double-event spectrum of FIG. 10, resulting in a single-event spectrum that appears more similar to the lower count rate (lower dead time) spectrum of FIG. 7.

Figure 12:
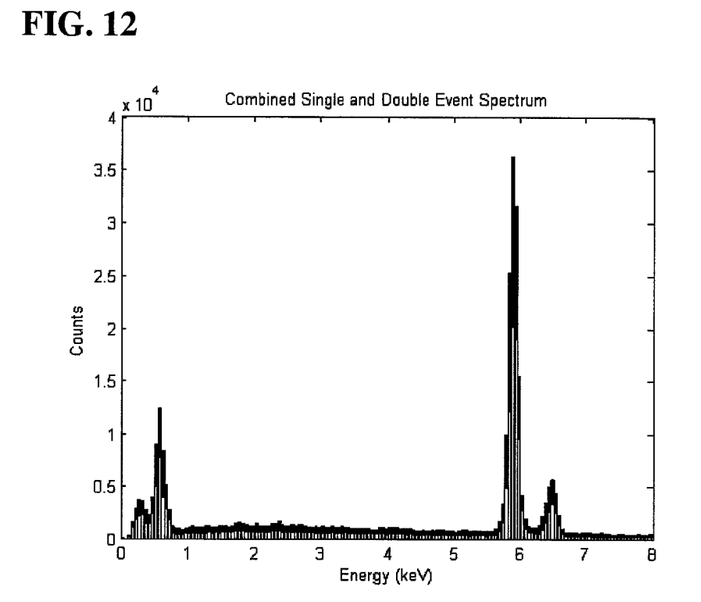
FIG. 12 illustrates a spectrum generated by combining the measured single-event spectrum of FIG. 2 (shown as the portions of the histogram having white bars) with the estimated single-event spectrum of FIG. 4 (shown as the portions of the histogram having black bars).
Figure 13:
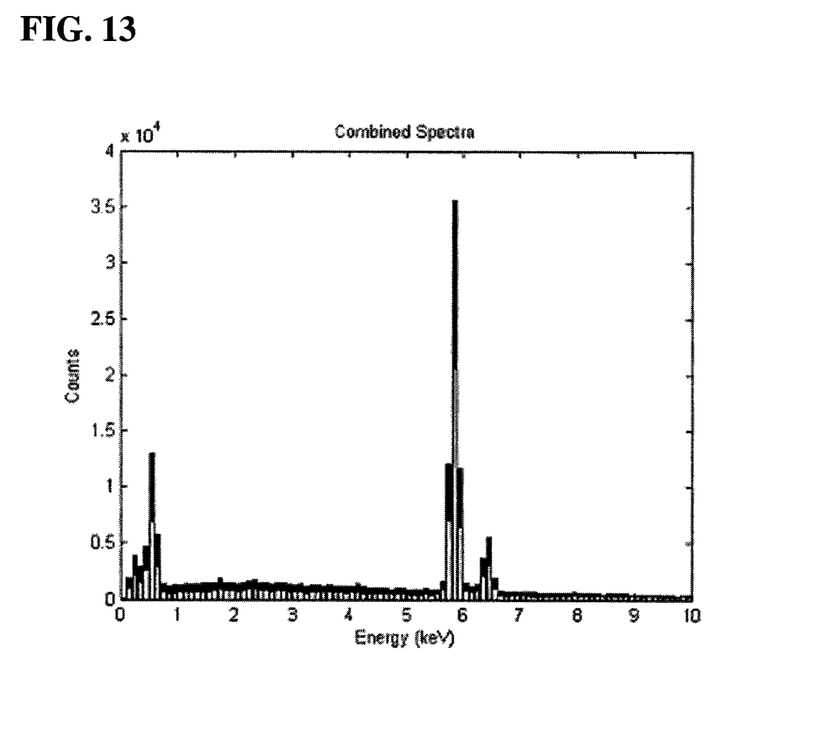
FIG. 13 illustrates a spectrum generated by combining the measured single-event spectrum of FIG. 2 (shown as the portions of the histogram having white bars) with the estimated single-event spectrum of FIG. 5 (shown as the portions of the histogram having black bars).

As also noted previously, the estimated single-event spectrum calculated from a measured combined-event spectrum can be added to the measured single-event spectrum to increase the number of counts therein (step 160 of FIG. 14), and thereby presumably increase its statistical reliability. This is seen in FIG. 12, wherein the estimated single events deconvolved from the combined (double) event spectrum of FIG. 3 are added to the measured single events of FIG. 2 (with the measured single-event spectrum of FIG. 2 being shown as the portions of the histogram having white bars, and the estimated single-event spectrum—seen separately in FIG. 4—being shown as the portions of the histogram having black bars). Similarly, FIG. 13 illustrates the estimated single events of FIG. 5 in combination with the measured single events of FIG. 2. It is seen that the addition of one or more estimated single-event spectra to the conventional single-event spectrum substantially increases throughput (i.e., event counts) and enhances spectral resolution.

Further advantages, features, and objects of the invention will be apparent from the remainder of this document in conjunction with the associated drawings.

DETAILED DESCRIPTION OF PREFERRED VERSIONS OF THE INVENTION

Expanding the discussion provided in the summary above, it is seen that the invention allows use of double or other combined events—in other words, pile-up events—to generate additional useful spectral information. Since pile-up events are dead time events which are traditionally discarded, collection and use of pile-up events can increase throughput, sometimes by a factor of two or more. Thus, the invention can be used to shorten data collection times, and/or can be used to provide better statistical accuracy over a given data collection time. Both of these advantages are valuable in a wide variety of spectrometric applications including microanalysis, x-ray mapping, x-ray quantitative analysis, x-ray fluorescence, high-energy particle detectors, and security screening systems.

For clarity's sake, it should be noted that the there are multiple differing uses of the term "pile-up" in the spectrometry field, and that this document generally uses the term to refer to events which are measured and identified as separate events, but which are too closely spaced in time for their individual energies to be determined by use of the applied shaping time. This is distinguished from the use of the term "undetected pile-up" to refer to multiple events that are effectively concurrent, such that they are measured and identified as a single event. As noted previously, these types of undetected pile-up events will appear in a normal single-event spectrum, most commonly as "sum peaks" at energy locations that correspond to the sums of other peaks in the single-event spectrum, and various methods of identifying and correcting sum peaks are known in the literature. See, e.g., Johansson, "Modifications of the HEX Program for Fast Automatic Resolution of PIXE-Spectra", X-ray Spectrom. 11:194 (1982); Sjoeland et al., "Time-resolved pile-up compensation in PIXE analysis with list-mode collected data", Nucl. Inst. Meth. Phys. Res. B, Vol. 150, Num. 1-4 (Apr. 2, 1999); Papp et al., "Quality Assurance Challenges in X-ray Emission Based Analyses, the Advantages of digital Signal Processing", Analytical Sciences, Vol. 21, pp. 737-745 (July 2005); and Statham, "Pile-Up correction for improved Accuracy and Speed of X-Ray Analysis", Microchimica Acta (2006). Other uses of the term "pile-up" exist as well, e.g., as in U.S. Pat. No. 5,225,682 to Britton et al, wherein "pile-up" is used to refer to events spaced significantly longer than the shaping time, in which case a minor correction to calculated event energies may need to be made based upon the time since the last detected event.

As noted previously, deconvolution of multiple-event spectra into one or more estimated single event spectra may occur with or without reference to any concurrently-collected single-event spectrum. An estimated single-event spectrum which is derived independently of any measured single-event spectrum is time-consuming and computationally burdensome to determine, but will have greater statistical significance. The computational framework for performing this type of deconvolution was discussed above. Conversely, an estimated single-event spectrum which is derived with reference to a measured single-event spectrum can be rapidly generated, but will have lower statistical significance owing to its correlation with the measured single-event spectrum. There are numerous ways to perform this type of deconvolution, and preferred methods will now be reviewed.

A first method involves simply looking to the measured single-event spectrum (e.g., FIG. 2), extracting the event energies from the peaks, and then looking to the measured double-event spectrum and determining which two event energies from the measured single-event spectrum sum (at least approximately) to the peaks in the measured double-event spectrum. Each count in the measured double-event spectrum can then be deconvolved into two corresponding counts from the measured single-event spectrum whose energies sum, exactly or approximately, to the energy of the double-event count.

A second method is essentially a more formal statement of the methods noted above. Here, the measured single-event spectrum (e.g., FIG. 2) is used to calculate an estimated double-event spectrum based upon the assumption that the pile-up events have the same energy distribution as single events. The estimated double-event spectrum is then used to deconvolve the measured double-event spectrum, and the two single events deconvolved from each double event are distributed into the estimated single-event spectrum according to the probability distribution generated from the measured single-event spectrum.

One method for calculating the expected double-event spectrum involves use of the following equations. These both express the expected energy distribution for the expected double-event spectrum, but the expressions differ for odd and even bins (i.e., for odd and even energy intervals along the spectral histogram, e.g., the 0.1 keV energy intervals along the abscissa/horizontal axis of the spectra of FIGS. 2-6):

$$\text{For even bins: } E_{2i} \propto \left(\sum_{m=1}^{i} (N_m \times N_{2i-m})\right) - \frac{N_i^2}{2} \tag{1}$$

$$\text{For odd bins: } E_{2i+1} \propto \sum_{m=1}^{i} (N_m \times N_{2i-m+1}) \tag{2}$$

Here, $N_i$ is the number of counts in the $i^{th}$ bin of the measured single-event spectrum and $E_i$ is the number of counts in the $i^{th}$ bin of the expected double-event spectrum. The resulting expected double-event spectrum can then be used to deconvolve the measured double-event spectrum:

$$S_i = \sum_j S_{ij} \tag{3}$$

$$S_{ij(i \neq j)} = \frac{M_j \times N_i \times N_{j-i}}{E_j} \tag{4}$$

$$S_{ij(i = j)} = \frac{M_j \times N_i \times N_{j-i}}{2E_j} \tag{5}$$

Where $M_j$ is the number of counts in the $j^{th}$ bin of the measured double-event spectrum; $S_{ij}$ is the number of counts contributed to the $i^{th}$ bin of the deconvolved double-event spectrum from the $j^{th}$ bin of the measured double-event spectrum; and $S_i$ is the number of counts contributed to the $i^{th}$ bin of the deconvolved double-event spectrum from the entire measured double-event spectrum.

Explained in general terms, this method deconvolves each double event into a distribution of single events, wherein the sum of the distribution is two. Thus, if N double events are deconvolved, they will provide a spectrum of 2N single events, although the events in each interval or "bin" of the spectral histogram will not necessarily be an integer. (The counts in each interval can be rounded to integers if desired, but preferably not until all of the events are deconvolved.)

There are also a variety of ways to deconvolve a measured double-event spectrum into an estimated single-event spectrum without reference to a concurrently-measured single-event spectrum. As an example, the detector data used to generate the measured double-event spectrum can also be analyzed with a short or variable shaping time to obtain at least some of the component single events of the measured double-event spectrum with low energy resolution. These low-resolution single events can then be used as starting estimates in the aforementioned iterative methods to generate a pair of estimated single events which together sum to or approximate each measured double event.

While the foregoing discussion primarily focused on the collection of a double event spectrum and its deconvolution to, and/or use with, a single event spectrum, it should be kept in mind that combined event spectra of other orders (e.g., triple-event spectra, four-event spectra, etc.) can be similarly collected and used (usually in conjunction with lower-order spectra, though they can be used alone). While FIGS. 1a-1d only illustrate single events (events spaced from adjacent events by greater than the defined shaping time) and double events (a pair of events spaced by an interval less than or equal to the shaping time), it is also possible to have triple events (three events wherein each is spaced from at least one adjacent event by an interval less than or equal to the shaping time); quadruple events (four events wherein each is spaced from at least one adjacent event by an interval less than or equal to the shaping time); and even higher-order events. Each of these can be collected and processed in the same manner as double events, though deconvolution grows more complex with each order: each triple event can be deconvolved into three single events, each quadruple event can be deconvolved into four single events, and so forth.

As also noted above, apart from "breaking down" combined-event spectra into single-event spectra to increase throughput and reduce the effects of dead time, the invention can also or alternatively use combined-event spectra to perform data quality checks on spectral measurements (e.g., it can be used to detect possible errors/issues with pulse processing and event detection), and/or it can use combined-event spectra to clean artifacts—in particular sum peaks from undetected pile-up—from single-event spectra. Comparison between single-event spectra and combined-event spectra for mismatch can indicate whether tuning of the spectrometer may be useful (e.g., tuning of the pulse processor to adapt the "pulse-pair resolution," the time required between two events to identify them as separate events). If any mismatch appears to arise from sum peaks, these sum peaks can be deconvolved into single events and can be added back into the single-event spectrum in a manner similar to the deconvolution of combined-event peaks. Alternatively or additionally, artifacts can be at least partially removed from a single-event spectrum by subtracting one or more combined-event spectra, preferably after scaling of the combined-event spectra.

This invention is particularly valuable with microanalysis methods wherein spectra are collected from several positions ("pixels") on a specimen to determine the composition at each pixel, with the several spectra then being combined as a "superspectrum" to reduce statistical variation (as described, e.g., by Kotula et al., "Automated Analysis of SEM X-ray Spectral Images: A Powerful New Microanalysis Tool," Micros. Microanal., Vol. 9, pp. 1-17 (2003)). The superspectrum generated by combining several noisy spectra can be used to generate the multiple event probability distributions for use in deconvolving the concurrently-collected multiple event spectra, and the resulting estimated single events can then be combined with the superspectrum (or with the spectra of the individual pixels) to reduce the impact of the noise therein.

The foregoing techniques are applicable to detector data provided in virtually any form, including those forms illustrated in FIGS. 1a-1d. In addition, the foregoing techniques may be used in conjunction with prior methods for reducing dead time. For example, the aforementioned technique of using variable shaping times may be used for events which are spaced by at least some minimum shaping time, and for events spaced by less than the minimum shaping time, the techniques of the invention may be used.

The foregoing techniques have been described as being applied to data captured from the detector of a spectrometer, and it is contemplated that the techniques will usually be implemented in the data processing system of a spectrometer (which is usually provided on an accompanying personal computer or similar data processing device connected in communication with the detector). It should be understood that the techniques may be performed in a processing device remote from the detector (e.g., at another location, with the detector data being transmitted to the processing device), and/or that the processing device may apply the techniques to the detector data either simultaneously with the detector's data capture, or at a later time. Thus, when this documents makes reference to use of the techniques in a spectrometer, it should be understood that the "spectrometer" may actually be hardware, software, and/or other components remote from the primary spectrometer components (the components at which the specimen, detector, etc. are situated), and that the various steps of the techniques may be spaced significantly in time.

It should be understood that the versions of the invention described above are merely exemplary. The invention is not intended to be limited to these versions, but rather is intended to be limited only by the claims set out below. Thus, the invention encompasses all different versions that fall literally or equivalently within the scope of these claims.

What is claimed is:

1. A method of processing closely spaced spectrometer detector events, the method including the steps of:
   a. collecting data items including measurement values and their respective times,
   b. determining events within the data items, each event occurring where a measurement value of a data item experiences a significant value change with respect to the measurement value of a prior data item;
   c. defining a shaping time;
   d. for a set of two or more consecutive events wherein no two adjacent events within the set are spaced by more than the shaping time, defining a combined event value representing the measurement values of all of the events within the set;
   e. at least one of:
      (1) storing and
      (2) displaying
      the combined event value along with other combined event values.

2. The method of claim 1 wherein the step of defining a combined event value representing the measurement values of all of the events within the set includes:
   a. for a set of two consecutive events wherein the events both occur within the shaping time, defining a combined double event value representing the measurement values of the two events within the set; and
   b. for a set of three consecutive events wherein adjacent events within the set both occur within the shaping time, defining a combined triple event value representing the measurement values of the three events within the set.

3. The method of claim 2 further including the steps of:
   a. at least one of:
      (1) storing and
      (2) displaying
      the combined double event value along with other combined double event values;
   b. at least one of:
      (1) storing and
      (2) displaying
      the combined triple event value along with other combined triple event values.

4. The method of claim 1 wherein the step of storing and/or displaying the combined event value includes displaying each combined event value in a spectral histogram, the spectral histogram displaying the numbers of combined event values resting within each of a series of combined event value intervals.

5. The method of claim 1 further comprising the step of deconvolving the combined event value into two or more event values having lesser value, wherein the combination of the lesser event values at least approximates the combined event value.

6. The method of claim 5 wherein the step of deconvolving the combined event value into two or more event values having lesser value includes deconvolving the combined event value into two or more single event values, wherein each single event value represents the measurement value of one of the events which is spaced from adjacent events by more than the shaping time.

7. The method of claim 5 further including the step of defining single event values, wherein:
   a. each event which is spaced from adjacent events by more than the shaping time is assigned a single event value, and
   b. the single event value represents the measurement value of the event.

8. The method of claim 7 wherein the step of deconvolving the combined event value into two or more event values having lesser value includes deconvolving the combined event value into two or more single event values.

9. The method of claim 1 further including the steps of:
   a. defining single event values wherein:
      (1) each event which is spaced from adjacent events by more than the shaping time is assigned a single event value, and
      (2) the single event value represents the measurement value of the event;
   b. convolving the single event values into estimated combined event values;
   c. comparing the combined event value and other combined event values with the estimated combined event values.

10. The method of claim 1 further including the steps of:
    a. defining single event values, wherein each single event value is the measurement value of an event which is spaced from adjacent events by more than the shaping time;
    b. subtracting the combined event values from the single event values.

11. The method of claim 10 wherein the step of subtracting the combined event values from the single event values includes: within each of several event value intervals, subtracting the number of combined event values therein from the number of single event values therein.

12. The method of claim 10 further including the step of scaling the combined event values prior to subtracting them from the single event values.

13. A spectrometer for processing closely spaced detector events, the spectrometer including:
    a. a detector which collects measurement values and their respective times;
    b. a processor which determines:
       (1) events within the measurement values, each event occurring where a measurement value has a significant value change in comparison to a prior measurement value;
       (2) combined event values, wherein for each set of two or more events wherein no two adjacent events within the set are spaced by more than a shaping time, a combined event value is defined which represents the measurement values of all of the events within the set;
    c. a memory storing the combined event values.

* * * * *